Oct. 22, 1929.  A. MORTON  1,732,906
POCKET LUMBER RULE AND MARKING GUIDE
Filed May 29, 1924
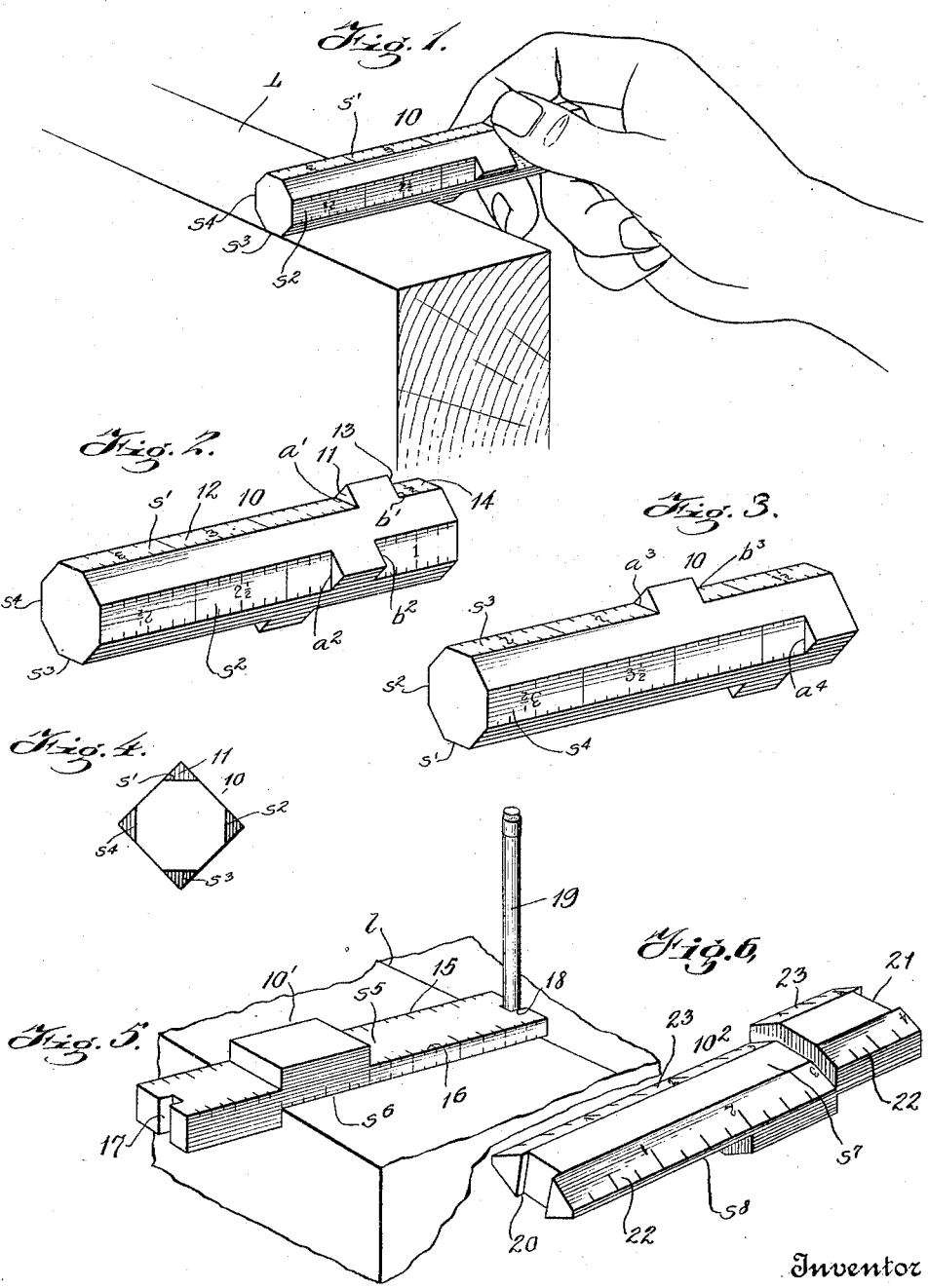
Inventor
ALEXANDER MORTON
By his Attorneys Patented Oct. 22, 1929

1,732,906

UNITED STATES PATENT OFFICE

ALEXANDER MORTON, OF GLEN RIDGE, NEW JERSEY, ASSIGNOR TO HELEN MORTON, OF GLEN RIDGE, NEW JERSEY

POCKET LUMBER RULE AND MARKING GUIDE

Application filed May 29, 1924. Serial No. 716,566.

This invention relates to a lumber rule and relates more particularly to a pocket lumber rule and marking guide.

A prime object of the present invention comprehends the provision of a pocket lumber rule designed for use in quickly and reliably gaging the dimension of lumber, and constructed for convenient fingering or handling the rapidly ascertaining different widths or thicknesses of lumber along or adjacent to any of the edges of walls thereof.

Further and related objects of the invention include the provision of a lumber rule or measuring device which may be used with equal convenience by the left or right hand of the user; the further provision of a lumber rule which although limited in dimensions so as to be easily pocketed, is capable of use for gaging a large number of different lumber thickness or widths; the still further provision of a rule of this nature which is designed for employment as a serviceable marking guide; and the provision of a combined pocket lumber rule and marking guide which may be manufactured and sold at an exceedingly low cost.

To the accomplishment of the foregoing and such other objects as may hereinafter appear, my invention consists in the elements and their relation one to the other, as hereinafter particularly described and sought to be defined in the claims, reference being had to the accompanying drawings which show preferred embodiments of my invention, and in which:

Fig. 1 is a perspective view showing one form of the lumber rule embodying my invention and depicting the manner of its use, Figs. 2 and 3 are perspective views of the same showing different measuring sides thereof, Fig. 4 is a cross-sectional view thereof, Fig. 5 is a perspective view of a modification of the invention and showing the same employed as a marking guide, and Fig. 6 is a perspective view of another modification of the invention and showing the preferred form thereof.

Before describing my invention in detail, I will briefly premise that the pocket lumber rule of my invention comprises a relatively elongated member constructed for convenient and facile handling, the member having a plurality of measuring sides along a plurality of longitudinal walls or faces of the rule, the measuring sides being provided with measuring sections adapted for co-action with adjacent or contiguous walls of lumber, the construction being such as to permit the rule or gage to be rapidly and reliably located in position for ascertaining at a glance any of a large number of different dimensions or measurements of the lumber.

Referring now more in detail to the drawings, and having particular reference to Figs. 1 to 4 thereof, I show one form of the lumber rule of my invention, the same comprising an elongated member generally designated as 10 which may be suitably made of wood or some molded composition material, the said member being provided with a plurality of measuring sides or walls, the form shown in Fig. 1 including four such measuring walls designated as $s'$, $s^2$, $s^3$ and $s^4$.

Each of the measuring walls is provided with one or more scaled sections, and in the preferred form of my invention at least one of said measuring walls is provided with two such sections with their scales running in opposite directions so as to permit different measurements to be obtained from different end portions of the gage or rule. Thus the measuring wall $s'$ is constructed to provide two sections or units designated as $a'$ and $b'$, each measuring section being defined by an abutment surface and a gage surface, the measuring section $a'$ being for example defined by an abutment wall or surface 11 and a measuring or gaging surface 12; and the section $b'$ being defined by the abutment wall 13 and the measuring wall 14. As is evident from Fig. 1 of the drawings, this construction permits the rapid locating or positioning of the rule against adjacent or contiguous walls or surfaces of a section of lumber L, so that the thickness or width thereof may be readily ascertained. The measuring sections $a'$ and $b'$ are preferably of different measuring lengths, permitting either end of the rule to be employed for gaging different widths or thicknesses of lumber.

For adapting the lumber rule for a large number of lumber dimensions, thus increasing the flexibility of service of the device, a plurality of walls of the rule are employed for dimensional purposes, as heretofore stated, and in the form of the invention shown in Figs. 1 to 4 of the drawings, the surfaces or sides $s^2$ and $s^3$ are both provided with a plurality of the measuring sections similar to but differing in dimensions from those of the measuring side $s'$. Thus the side $s^2$ comprises the sections $a^2$, $b^2$, and the side $s^3$ comprises the sections $a^3$, $b^3$. The section $s^4$ may, if desired, consist only of a single measuring section such as $a^4$. Having reference to Figs. 2 and 3 of the drawings, it will be seen that with all four sides of the rule utilized and with the rule only four inches long, a large number of differing lengths of measuring sections are provided for, which measuring sections may be graduated in parts of inches, as clearly depicted in the drawings.

To produce a lumber gage of this nature which will have an exceedingly low manufacturing and sales cost, the same preferably consists of an integral unit suitably contoured by notching the same, as shown in the drawings, to produce the abutment and measuring walls or surfaces.

Referring now to Fig. 5 of the drawings, I show a modification of the invention in which only two measuring sides are used, the lumber rule shown in Fig. 5 showing its adaptability and including means for permitting the rule to be employed efficiently as a marking guide. In this form of my invention the rule also consists in an elongated member 10' having the measuring sides $s^5$ and $s^6$, each side being suitably graduated as at 15 and 16 along the two longitudinal edges of the rule, this construction permitting not only the employment of two measuring sides and the use of the rule from either end thereof, but being capable of use from opposite edges of a given measuring side, the relations being such that the lumber may be gaged or measured along or adjacent to any of the edges or walls thereof.

For use as a marking guide, the rule is provided with means for holding a marking device such as a pencil at a point spaced from an abutment surface of the measuring side, and preferably such means consists of a notch produced in the end of the rule, the preferred construction including the provision of the notches 17 and 18 at both ends of the rule, each adapted for receiving a marking element 19. The use of the marking guide is clearly depicted in Fig. 5 of the drawings, the abutment surface of the measuring side $s^6$ lying in engagement with one wall of a section of lumber, and the marking element 19 being in engagement with another wall at a point spaced from the edge of the lumber, so that when the rule is moved along the section of lumber, a marking line $l$ will be produced.

Referring now to Fig. 6 of the drawings, in which I show a further and preferred form of the invention, the relatively elongated rule 102 comprises the two measuring sides $s^7$ and $s^8$, at least one of which includes the plurality of measuring units or sections as heretofore described, the said rule further including the notches or recesses 20 and 21 produced in opposite ends thereof for holding a marking element or device. In this form of my invention, the opposite edge portions are bevelled to produce the inclined surfaces 22 and 23, each of which is preferably graduated in parts of inches, the construction being such as to permit a more accurate reading, either side edge of a measuring surface being capable of employment, adapting the device, as heretofore stated, for use along opposite edges of a piece of lumber from either end of the rule handled by either the right or left hand of the user, depending upon the conditions and needs of service.

While I have shown the preferred forms of my invention, it will be obvious that many changes and modifications may be made in the structure disclosed without departing from the spirit of the invention defined in the following claims.

I claim:

1. A pocket lumber rule comprising an elongated body having a plurality of exteriorly and longitudinally disposed oblong surfaces provided respectively with the divisions of a plurality of scales, said body also having a projection extending laterally outward from said surfaces respectively and arranged in staggered relationship about said body and at different distances from the ends thereof, whereby certain of said graduated surfaces are divided into parts of different lengths.

2. A pocket lumber rule comprising an elongated body having flat end surfaces disposed in parallel planes at right angles to the length of the body, and further having a plurality of exteriorly and longitudinally disposed oblong surfaces provided respectively with the divisions of a plurality of scales, said body also having a projection extending laterally outward from said graduated surfaces respectively and arranged in staggered relationship about said body at different distances from the ends thereof, whereby the several scales are of different lengths and certain of them are divided into parts respectively extending to opposite ends of the body.

In testimony whereof, I have signed my name to this specification this 3rd day of May, 1924.

ALEXANDER MORTON.